(12) United States Patent
Hunt et al.

(10) Patent No.: US 9,348,029 B2
(45) Date of Patent: May 24, 2016

(54) IMAGING SYSTEM FOR WIRE DETECTION

(71) Applicant: THE BOEING COMPANY, Chicago, IL (US)

(72) Inventors: Jeffrey H. Hunt, Thousand Oaks, CA (US); Nicholas Koumvakalis, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/851,832

(22) Filed: Mar. 27, 2013

(65) Prior Publication Data

US 2014/0293262 A1 Oct. 2, 2014

(51) Int. Cl.
*G01C 3/08* (2006.01)
*G01S 17/89* (2006.01)
*G01S 17/93* (2006.01)
*G01S 7/48* (2006.01)
*G01S 7/484* (2006.01)
*G01S 7/487* (2006.01)
*G01S 7/499* (2006.01)

(52) U.S. Cl.
CPC .............. *G01S 17/89* (2013.01); *G01S 7/4802* (2013.01); *G01S 7/484* (2013.01); *G01S 7/487* (2013.01); *G01S 17/933* (2013.01); *G01S 7/499* (2013.01)

(58) Field of Classification Search
CPC ........ G01C 3/08; G01C 15/002; G01S 17/89; G01S 7/4817; G01S 17/42
USPC ......... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 5,982,480 | A  * | 11/1999 | Itzkovich et al. | 356/141.1 |
| 6,594,003 | B1 * | 7/2003 | Horiuchi et al. | 356/73.1 |
| 7,239,262 | B2 * | 7/2007 | Osepchuk | F41H 13/0043 342/22 |
| 7,512,511 | B1 * | 3/2009 | Schultz et al. | 702/127 |
| 8,193,966 | B2 | 6/2012 | Holly et al. | |
| 2006/0231771 | A1 * | 10/2006 | Lee et al. | 250/458.1 |
| 2008/0129316 | A1 * | 6/2008 | Zoughi et al. | 324/637 |
| 2012/0123684 | A1 * | 5/2012 | Vu et al. | 702/14 |

* cited by examiner

*Primary Examiner* — Luke Ratcliffe
*Assistant Examiner* — Samantha K Abraham
(74) *Attorney, Agent, or Firm* — Vista IP Law Group LLP; Cynthia A. Dixon

(57) ABSTRACT

The present disclosure provides a system, method, and apparatus for detection and imaging. In one or more embodiments, the disclosed method involves transmitting, with a first optical transmitter, a first transmit signal to an object (e.g., a wire); and transmitting, with a second optical transmitter, a second transmit signal to the object. The method further involves receiving, with an optical receiver, a receive signal that is reflected from the object. In one or more embodiments, the receive signal is a function of the first transmit signal and the second transmit signal. Further, the method involves detecting, with a detector, the receive signal. The frequency of the receive signal is the sum of the frequency of the first transmit signal and the frequency of the second transmit signal, and/or is the difference between the frequency of the first transmit signal and the frequency of the second transmit signal.

20 Claims, 3 Drawing Sheets

IMAGING SYSTEM FOR WIRE DETECTION

BACKGROUND

The present disclosure relates to an imaging system. In particular, it relates to an imaging system for wire detection.

Wire detection is imperative for low flying platforms, such as rotorcraft (e.g., helicopters), because the intersection of wires (e.g., telephone wires or power lines) and a rotor can result in catastrophic consequences. Currently, wire detection for rotorcrafts is very difficult to do. Wires are very thin relative to the detection capabilities of most remote imaging systems, thereby making them very difficult to detect from the background during day or nighttime operations and especially during inclement weather.

Therefore, an improved imaging system for wire detection is needed.

SUMMARY

The present disclosure relates to a method, system, and apparatus for an imaging system for wire detection. The disclosed method for detection and imaging involves transmitting, with a first optical transmitter, a first transmit signal to an object (e.g., a wire). The method further involves transmitting, with a second optical transmitter, a second transmit signal to the object. Also, the method involves receiving, with an optical receiver, a receive signal that is reflected from the object. In one or more embodiments, the receive signal is a function of the first transmit signal and the second transmit signal. In addition, the method involves detecting, with a detector, the receive signal.

In one or more embodiments, the frequency of the receive signal is the sum of the frequency of the first transmit signal and the frequency of the second transmit signal, and/or is the difference between the frequency of the first transmit signal and the frequency of the second transmit signal. In at least one embodiment, the first optical transmitter and the second optical transmitter are each a laser. In some embodiments, the first transmit signal and the second transmit signal are each pulsed signals. In one or more embodiments, the first transmit signal and the second transmit signal are synchronized to each other and to the detector.

In at least one embodiment, the optical receiver is a telescope. In some embodiments, the method further involves generating, with at least one signal generator, the first transmit signal and the second transmit signal.

In one or more embodiments, the method further involves polarizing, with at least one polarizer, the first transmit signal and the second transmit signal. In at least one embodiment, the first transmit signal is polarized to be horizontal polarization, vertical polarization, right-hand polarization, or left-hand polarization. In some embodiments, the second transmit signal is polarized to be horizontal polarization, vertical polarization, right-hand polarization, or left-hand polarization.

In at least one embodiment, the method further involves filtering, by at least one filter, the receive signal. In some embodiments, the method further involves amplifying, with at least one amplifier, the receive signal.

In one or more embodiments, a system for detection and imaging comprises a first optical transmitter to transmit a first transmit signal to an object, and a second optical transmitter to transmit a second transmit signal to the object. The system further comprises an optical receiver to receive a receive signal that is reflected from the object. In at least one embodiment, the receive signal is a function of the first transmit signal and the second transmit signal. Further, the system comprises a detector to detect the receive signal.

In at least one embodiment, the system further comprises at least one signal generator to generate the first transmit signal and the second transmit signal. In some embodiments, the system further comprises at least one polarizer to polarize the first transmit signal and the second transmit signal. In one or more embodiments, the system further comprises at least one filter to filter the receive signal. In at least one embodiment, the system further comprises at least one amplifier to amplify the receive signal.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative imaging system for wire detection. Specifically, the system uses a nonlinear optical mixing at the wire (i.e. the object) to enhance the signal to background ratio. For this system, two optical sources are aimed in the direction of a wire. Rather than detecting incident light, only light that is generated via the nonlinear optical processes, at the wire, is detected. Specifically, the sum-frequency of the two input signals or the difference-frequency of the two input signals is observed. The nonlinear signal will only be generated at the wire, so that, in a spectral context, the wire will be able to be more readily distinguished from the input signals and the background light. It should be noted that the incident frequencies can be selected so that they can spectrally enhance the nonlinear process, thereby providing for overall stronger signals and an enhanced signal to background ratio.

As previously mentioned above, wire detection is imperative for low flying platforms, such as rotorcraft (e.g., helicopters), because the intersection of wires (e.g., telephone wires or power lines) and a rotor can result in catastrophic consequences. Currently, wire detection for rotorcrafts is very difficult to do. Wires are very thin relative to the detection capabilities of most remote imaging systems, thereby making them very difficult to detect from the background during day or nighttime operations and especially during inclement weather.

Most current, conventional imaging systems, whether passive or active, rely on the total photon flux to locate an object. Since there is always background light present, the resolution relies on very small discrimination between the background sky light and the wires that cross in the sky. The wires are quite thin relative to the full scene, so that they will likely only occupy a few pixels in the vertical direction. Active illumination can help detect the wires, but still must compete with background signals.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
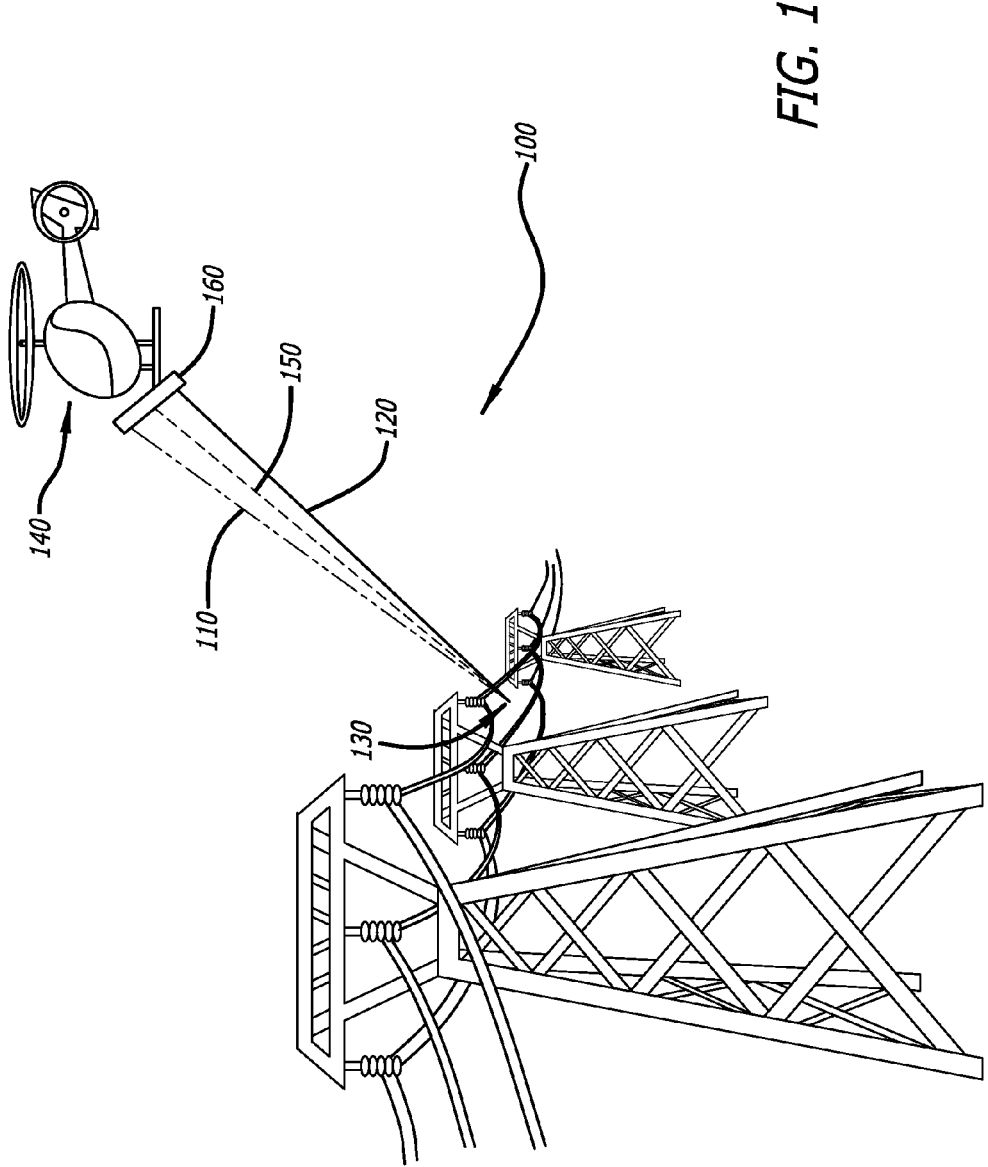
FIG. 1 is a schematic diagram of the disclosed system for detection and imaging, in accordance with at least one embodiment of the present disclosure.

FIG. 1 is a schematic diagram of the disclosed system 100 for detection and imaging, in accordance with at least one embodiment of the present disclosure. In this figure, a helicopter 140 is shown to be transmitting two signals (i.e. a first transmit signal and a second transmit signal) 110, 120 towards a power-line wire 130 (i.e. an object). The first transmit signal 110 has a frequency of $w_1$, and the second transmit signal 120 has a frequency of $w_2$. In one or more embodiments, the first transmit signal 110 and the second transmit signal 120 are both optical signals (e.g., from ultraviolet wavelengths to infrared wavelengths). In at least one embodiment, the wavelength of the first transmit signal 110 and the wavelength of the second transmit signal 120 have a difference in range from one another of approximately 10,000 wavenumbers.

When the first transmit signal 110 and the second transmit signal 120 meet at the wire 130 (i.e. the object), non-linear interactions occur, which cause second-order mixing of the first transmit signal 110 and the second transmit signal 120. From this mixing of the signals, a signal (i.e. a receive signal) 150 is generated. The receive signal 150 has a frequency of $w_3$, where $w_3=w_1+w_2$ and/or $w_3=w_1-w_2$ (assuming $w_1>w_2$). A sensor 160 at the helicopter 140 receives the receive signal 150. The receive signal 150 indicates the presence, location, and distance (e.g., by using time delay of the signals) of the wire 130 (i.e. the object).

Below is a detailed description of the non-linear mixing of the signals.

Sum-Frequency Generation and Difference-Frequency Generation

At this point in the development of the optical sciences, nonlinear optics, and specifically, optical processes in which the frequency of inputs and outputs to a sample or target (e.g., a wire (i.e. the object)) are not the same, are very well understood and very well publicized. One of the simplest and the first experimentally observed process is sum-frequency generation (SFG). This optical process is based on the combining or mixing of two input photons at frequency $\omega_1$ and $\omega_2$, thereby resulting in the generation of a third photon at $\omega_3$. Since photon/photon interactions are generally very weak, the mixing processes will usually occur in some matter with a finite optical nonlinearity.

Sum-frequency generation is process in which photons satisfy energy conservation, leaving the matter unchanged:

$$h\omega_3 = h\omega_1 + h\omega_2$$

A special case of sum-frequency generation is the second harmonic generation in which $\omega_1=\omega_2=\frac{1}{2}\omega_3$. In fact, in experimental physics, this is the most common type of sum-frequency generation because only one input light beam is required. (In general, for sum-frequency generation, $\omega_1 \neq \omega_2$, so that two simultaneous laser beams are required, which can be more difficult to arrange. In practice, the term "sum-frequency generation" usually refers to the less common case where $\omega_1 \neq \omega_2$.)

For sum-frequency generation to occur efficiently, a condition called phase-matching must be satisfied, $$h\vec{k}_3 = h\vec{k}_1 + h\vec{k}_2$$

where $\vec{k}_1$, $\vec{k}_2$, $\vec{k}_3$ are wavevectors of three waves as they travel through the medium. (This equation is the optical equivalent of the conservation of energy. Note that the k's in the equation are vector quantities, and must be calculated as such.) As this condition is satisfied, the sum-frequency generation becomes more and more efficient. SFG is sufficiently common in standard applications, such as sum-frequency generation spectroscopy.

Difference-frequency generation (DFG) is analogous SFG. Here the energy and phase matching conditions are:

$$h\omega_3 = h\omega_1 - h\omega_2$$

and $$\vec{k}_3 = h\vec{k}_1 - j\vec{k}_2$$

Figure 2:
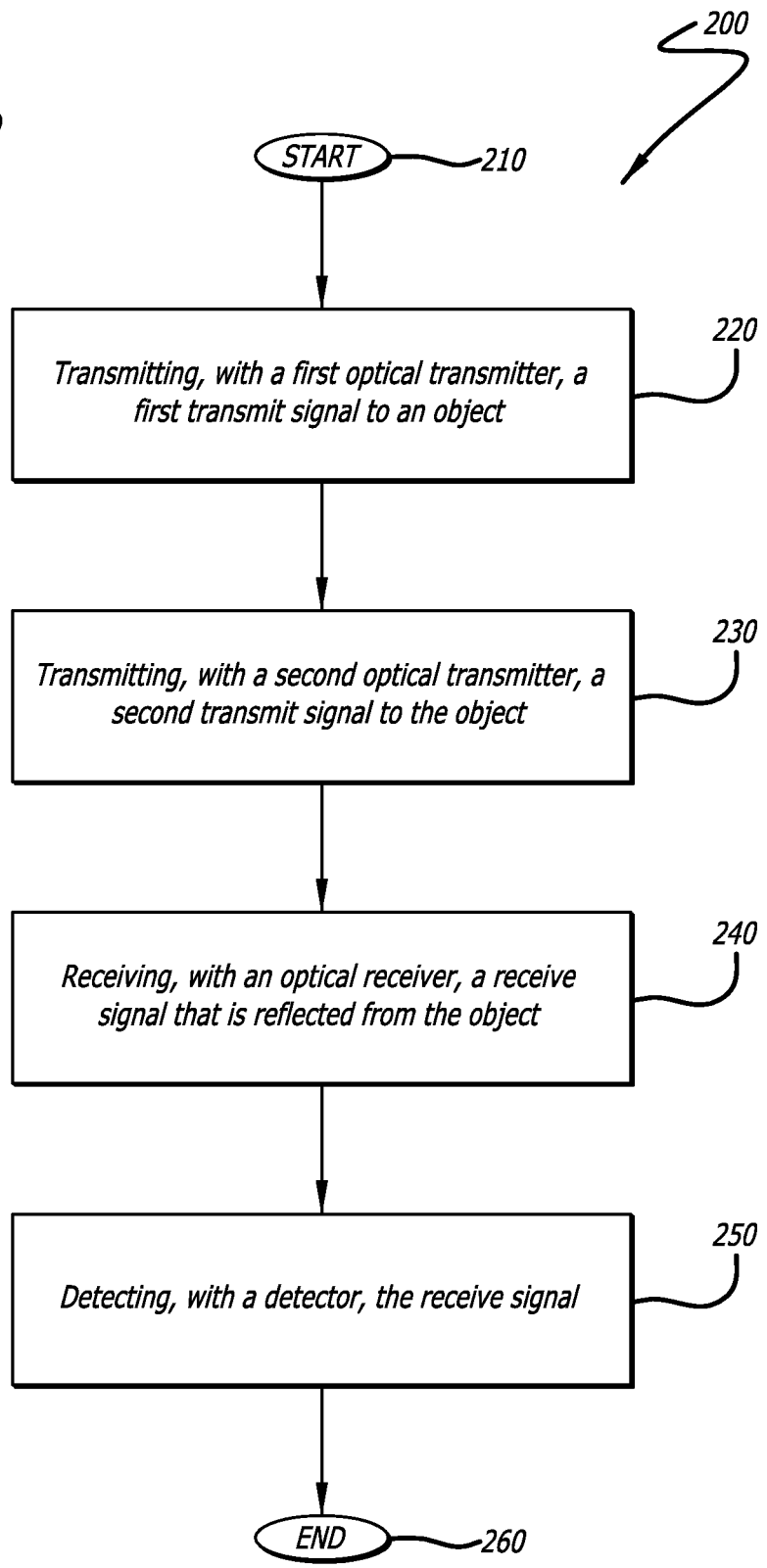
FIG. 2 is a flow chart for the disclosed method for detection and imaging, in accordance with at least one embodiment of the present disclosure.

FIG. 2 is a flow chart for the disclosed method 200 for detection and imaging, in accordance with at least one embodiment of the present disclosure. At the start 210 of this method 200, a first optical transmitter transmits a first transmit signal to an object (e.g., a wire) 220. Also, a second optical transmitter transmits a second transmit signal to the object 230. Then, an optical receiver receives a receive signal that is reflected from the object 240. The receive signal is a function of the first transmit signal and the second transmit signal. A detector then detects the receive signal 250. Then, the method 200 ends 260.

It should be noted that in other embodiments, more or less steps than shown for the method 200 of FIG. 2 may be performed. In addition, the steps shown in the method 200 of FIG. 2 may be performed in various different orders than as is shown in FIG. 2.

Figure 3:
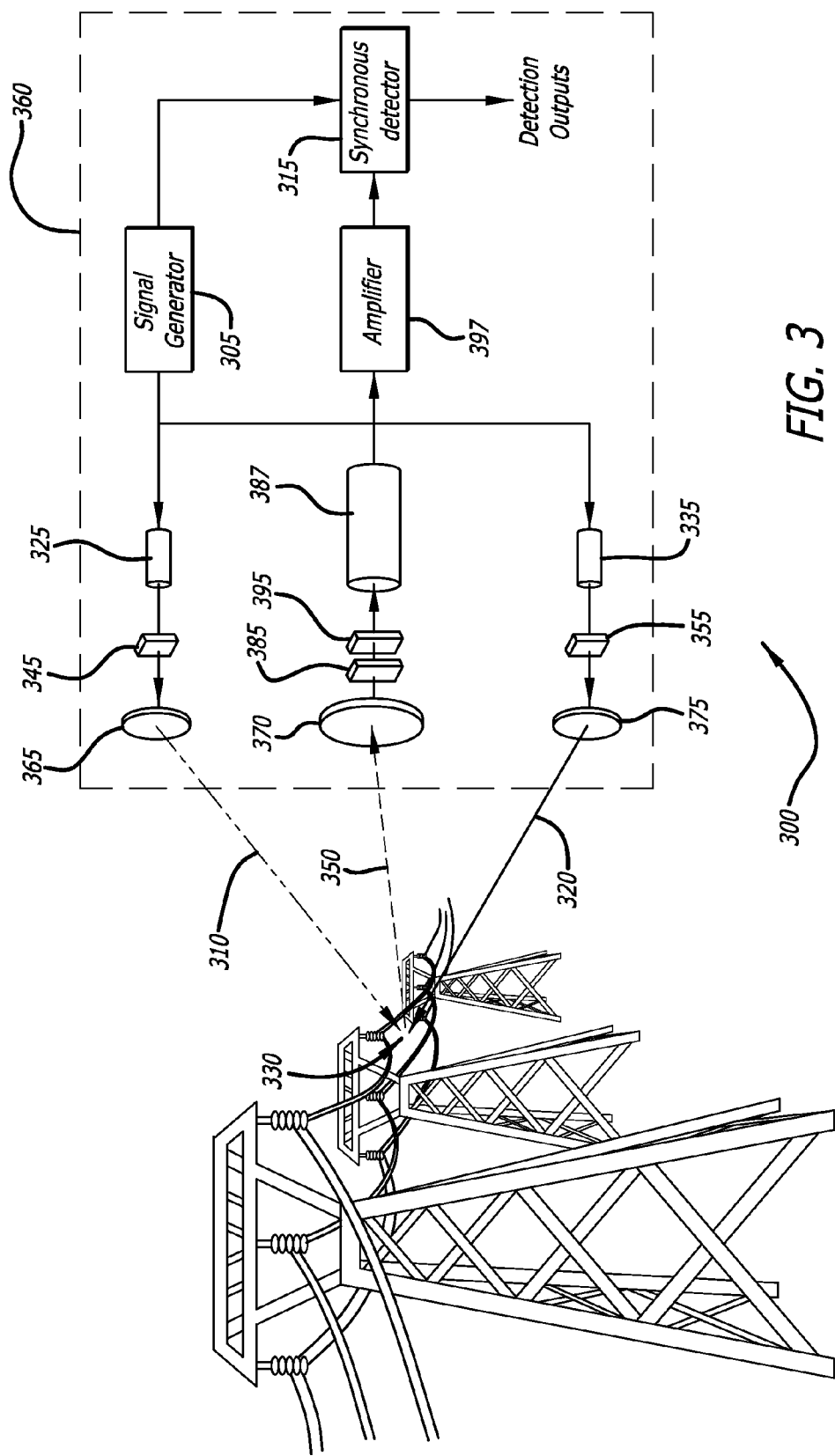
FIG. 3 is a schematic diagram for the system of FIG. 1 showing exemplary optical hardware employed by the system, in accordance with at least one embodiment of the present disclosure.

FIG. 3 is a schematic diagram 300 for the system 100 of FIG. 1 showing exemplary optical hardware employed by the system 100, in accordance with at least one embodiment of the present disclosure. In this figure, a sensor 360 on the helicopter (not shown in figure) is shown to contain various optical hardware. In this sensor 360, a signal generator 305 generates a signal. In one or more embodiments, the signal is a pulsed signal. This signal is then synchronized with a detector 315. The synchronized signal is transmitted by a first optical transmitter 325 and a second optical transmitter 335. In one or more embodiments, the first optical transmitter 325 and the second optical transmitter 335 are each an optical laser.

The signals transmitted from the first optical transmitter 325 and the second optical transmitter 335 are each polarized by a polarizer 345, 355, and are sent through transmitter optics 365, 375. The polarizer 345, 355 polarizes the signals to be either linearly polarized (i.e. horizontal polarization or vertical polarization) or circularly polarized (i.e. right-hand polarization or left-hand polarization). The signals may each be of the same polarization (e.g., one signal is horizontal polarization and the other signal is horizontal polarization) or may each be of a different polarization (i.e. a cross polarization) (e.g., one signal is horizontal polarization and the other signal is vertical polarization).

The transmitter optics 365, 375 may include, for example, at least one lens and/or at least one mirror. In one or more embodiments, components (e.g., at least one mirror) of the transmitter optics 365, 375 may be gimbaled so as to point the transmitted signals towards an object (e.g., a wire) or as to scan the transmitted signals across the field of view in an attempt to locate an object(s).

After the signals pass through the transmitter optics 365, 375, the first transmit signal 310 and the second transmit signal 320 are transmitted towards the wire 330 (i.e. the object). The first transmit signal 310 has a frequency of $w_1$, and the second transmit signal 320 has a frequency of $w_2$. When the first transmit signal 310 and the second transmit signal 320 meet at the wire 330, non-linear interactions occur, which cause second-order mixing of the first transmit signal 310 and the second transmit signal 320. From this mixing of the signals, a signal (i.e. a receive signal) 350 is generated. The receive signal 350 has a frequency of $w_3$, where $w_3=w_1+w_2$ and/or $w_3=w_1-w_2$ (assuming $w_1>w_2$).

The receive signal 350 is reflected from the wire 330 (i.e. the object) in the direction of the sensor 360 on the helicopter (not shown). The receive signal is received by a receive telescope 387 in the sensor 360 via receiver optics 370 (e.g., at least one lens and/or at least one mirror), a polarizer 385 to select for a specific polarization to be detected, and a filter 395 to filter for the frequency bandwidth to be detected. After the receive telescope 387 receives the receive signal 350, the signal is amplified by an amplifier 397 and detected by a detector 315. The signal is then processed by at least one processor (not shown) to determine the presence, location, and distance (e.g., by using time delay of the signals) of the wire 330 (i.e. the object).

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for detection and imaging, the method comprising: transmitting, with a first optical transmitter, a first transmit signal to a location on a surface of an object; transmitting, with a second optical transmitter, a second transmit signal to the location on the surface of the object, wherein at the location on the surface of the object there is a nonlinear optical mixing of the first transmit signal and the second transmit signal to produce a receive signal via optical processes that occur at the location on the surface of the object; receiving, with an optical receiver, the receive signal that is reflected from the object, wherein the receive signal is a function of the first transmit signal and the second transmit signal; and detecting, with a detector, the receive signal that is used to determine presence of the object; wherein a frequency of the receive signal is at least one of the sum of a frequency of the first transmit signal and a frequency of the second transmit signal, and the difference between a frequency of the first transmit signal and a frequency of the second transmit signal.

2. The method of claim 1, wherein the first optical transmitter and the second optical transmitter are each a laser.

3. The method of claim 1, wherein the first transmit signal and the second transmit signal are each pulsed signals.

4. The method of claim 1, wherein the first transmit signal and the second transmit signal are synchronized to each other and to the detector.

5. The method of claim 1, wherein the optical receiver is a telescope.

6. The method of claim 1, wherein the method further comprises generating, with at least one signal generator, the first transmit signal and the second transmit signal.

7. The method of claim 1, wherein the method further comprises polarizing, with at least one polarizer, the first transmit signal and the second transmit signal.

8. The method claim 7, wherein the first transmit signal is polarized to be one of horizontal polarization, vertical polarization, right-hand polarization, and left-hand polarization; and the second transmit signal is polarized to be one of horizontal polarization, vertical polarization, right-hand polarization, and left-hand polarization.

9. The method of claim 1, wherein the method further comprises filtering, by at least one filter, the receive signal.

10. The method of claim 1, wherein the method further comprises amplifying, with at least one amplifier, the receive signal.

11. A system for detection and imaging, the system comprising: a first optical transmitter to transmit a first transmit signal to a location on a surface of an object; a second optical transmitter to transmit a second transmit signal to the location on the surface of the object, wherein at the location on the surface of the object there is a nonlinear optical mixing of the first transmit signal and the second transmit signal to produce a receive signal via optical processes that occur at the location on the surface of the object; an optical receiver to receive the receive signal that is reflected from the object, wherein the receive signal is a function of the first transmit signal and the second transmit signal; and a detector to detect the receive signal that is used to determine presence of the object; wherein a frequency of the receive signal is at least one of the sum of a frequency of the first transmit signal and a frequency of the second transmit signal, and the difference between a frequency of the first transmit signal and a frequency of the second transmit signal.

12. The system of claim 11, wherein the first optical transmitter and the second optical transmitter are each a laser.

13. The system of claim 11, wherein the first transmit signal and the second transmit signal are each pulsed signals.

14. The system of claim 11, wherein the first transmit signal and the second transmit signal are synchronized to each other and to the detector.

15. The system of claim 11, wherein the optical receiver is a telescope.

16. The system of claim 11, wherein the system further comprises at least one signal generator to generate the first transmit signal and the second transmit signal.

17. The system of claim 11, wherein the system further comprises at least one polarizer to polarize the first transmit signal and the second transmit signal.

18. The system claim 17, wherein the first transmit signal is polarized to be one of horizontal polarization, vertical polarization, right-hand polarization, and left-hand polarization; and the second transmit signal is polarized to be one of horizontal polarization, vertical polarization, right-hand polarization, and left-hand polarization.

19. The system of claim 11, wherein the system further comprises at least one filter to filter the receive signal.

20. The system of claim 11, wherein the system further comprises at least one amplifier to amplify the receive signal.

* * * * *